July 2, 1963
H. W. SMITH ETAL
3,096,477
ELECTRICAL WELL LOGGING APPARATUS AND METHOD IN WHICH THE MEASURING CURRENT DENSITY IS CONTROLLED A SUBSTANTIAL DISTANCE FROM THE BOREHOLE Filed Dec. 29, 1958 — 6 Sheets-Sheet 1

HAROLD W. SMITH
WM. C. DUESTERHOEFT, JR
FRANCIS X. BOSTICK, JR.
WILLIAM GARNER, JR.
INVENTORS

BY Browning, Simms, Hyer & Eickenroht
ATTORNEYS

---- FLOW LINE
—— EQUIPOTENTIAL LINE

HAROLD W. SMITH
WM. C. DUESTERHOEFT, JR.
FRANCIS X. BOSTICK, JR.
WILLIAM GARNER, JR.
INVENTORS

HAROLD W. SMITH
WM. C. DUESTERHOEFT, JR.
FRANCIS X. BOSTICK, JR.
WILLIAM GARNER, JR.
INVENTORS

BY Browning, Simons, Hyer
& Eickenroht 3,096,477
ELECTRICAL WELL LOGGING APPARATUS AND METHOD IN WHICH THE MEASURING CURRENT DENSITY IS CONTROLLED A SUBSTANTIAL DISTANCE FROM THE BOREHOLE
Harold W. Smith, William C. Duesterhoeft, Jr., Francis X. Bostick, Jr., and William Garner, Jr., all of Austin, Tex., assignors to Dresser Industries, Inc.
Filed Dec. 29, 1958, Ser. No. 783,548
20 Claims. (Cl. 324—1)

This invention relates to a method and apparatus for logging the electrical resistivity (or conductivity of earthen formation surrounding a borehole. In one of its aspects, it relates to a new method and apparatus for controlling the current density of a measuring current flowing through a formation at a substantial distance from the borehole. In another of its aspects, it relates to a new method and apparatus in which the distribution of a measuring current is controlled despite variations in the resistivity of formations surrounding the borehole.

At the present time, there is no logging system in general use that is capable of obtaining measurements reflecting conditions existing in only the undisturbed portion of a sub-surface earth formation. Without exception, the recorded measurements of every logging device are influenced to some extent by the unwanted effects of the borehole, adjacent beds, invaded zones, etc. Attempts have been made to reduce the influence of these factors but none have been entirely successful. Ideally, the density of the measuring current should be relatively low in certain zones, such as the invaded zone, of which the resistivity measurement is not desired, and relatively high in those zones such as the undisturbed zone, of which the resistivity measurement is desired. This arrangement would result in the invaded zone, etc. contributing very little to the total resistivity measurement which would then be comprised substantially only of the contribution made by the undisturbed zone.

While such a current density distribution may have been desired, it has heretofore not been achieved in any practical manner. Moreover, obtaining the distribution is not in itself enough because it must be maintained as the measuring current passes through a variety of formations during the logging operation. Thus, in general, there is a tendency for the measuring current to concentrate in zones of low resistivity and to turn away from those of high resistivity. With the introduction of these foreign bodies into a homogenous medium, the current distribution is no longer the same as it had been in homogenous medium. The distortion of the current and voltage patterns must be taken into account in order to convert the apparent resistivity into a true formation resistivity. Therefore, there is a problem of not only obtaining the desired current distribution, but maintaining it despite the distortive influence of adjacent zones of different resistivities.

It is an object of the invention to provide a new method and apparatus for logging the electrical properties of earthen formations in which the measuring current density is materially controlled for a substantial distance laterally of the borehole in such a manner that there is a substantial compensation of the natural tendency of the measuring current to concentrate in regions of high conductivity and decrease in regions of low conductivity whereby the measuring current density is maintained more uniformly.

Another object is to provide an electric logging method and apparatus in which the measuring current can be controlled to flow through a desired part of a formation being logged so that such part contributes a major portion of the total resistivity reading and other parts of the formation remote from the desired part contribute relatively less to the total resistivity reading.

Another object is to provide a method and apparatus in which the current density can be maintained relatively constant despite the distorting influence of adjacent beds or zones.

Another object of the invention is to provide a method and apparatus which, in effect, senses changes in resistivities of formations lying adjacent to that through which the measuring current is flowing and utilizes this information in a manner so as to minimize the distorting effect of these formations on the measuring current.

Another object is to provide a method and apparatus in which the measuring current density is automatically controlled to limit variations thereof despite the influence of formation factors tending to cause changes in the distribution of the measuring current.

In accordance with one aspect of this invention, the density of a measuring current is controlled at a desired lateral distance from the borehole by establishing an electrical field adjacent the path of the measuring current and then controlling the distribution of this field in such a manner that it causes the desired response of the measuring current density at points situated substantially lateral distances in the formation. Thus, current is caused to flow between an end electrode means and an intermediate electrode means and also between the end electrode means and a point remote therefrom. The field associated with this flow of current has a controlling effect upon the density of the measuring current and by varying the field, as by varying the current flowing from the end electrode means to the intermediate electrode means, the configuration and hence the density of the measuring current can be controlled. In most instances, it will be highly desirable to also cause current to flow between the intermediate electrode means and a point remote therefrom. In such case, the current flowing between the end electrode means and the intermediate electrode means controls the distribution of current density along the intermediate electrode means. Thus as the current flow between the end electrode means and the intermediate electrode means increases, the current density laterally of the measuring current electrode means and laterally of a portion of the intermediate electrode adjacent the measuring electrode means, will likewise increase. This increases the density of the measuring current flowing in the formation located laterally of the measuring electrode means. Conversely, decreasing the current flow between the end electrode means and the intermediate electrode means decreases the density of measuring current in such lateral formation. Thus by controlling the current density along the electrode means, the measuring current density configuration in the formation can likewise be controlled.

By suitable control of the fields established adjacent the path of the measuring current, it is possible to pinch the measuring current path (decrease its vertical depth) out in the formation so as to increase the density of the measuring current at the location of the pinch. This means that the formation at the measuring current pinch will contribute relatively more to the resistivity or conductivity measurement than would such formation in the absence of the pinch.

In accordance with another aspect of this invention, the density of a measuring current is maintained substantially constant, despite the distortive influence of adjacent formations, by sensing the resistivity of these formations and using this information to determine the distribution of an electrical field lying adjacent the path of the measuring current. For example, if the adjacent formation is of lower resistivity than the one through which the measuring current is flowing so that the latter tends to spread out and become less dense, the field is increased in strength to, in effect, counterbalance the current spreading effect of the adjacent formation. Where the pinch effect feature of this invention is being used, the current density along the electrode means is controlled to vary the effect of the field on the measuring current so that the measuring current density configuration (pinch) in the formation remains substantially constant.

One practical but not the only way of so controlling the field responsive to resistivity variations of adjacent formations, is to cause current to flow from a primary current source to both the measuring electrode means and the intermediate electrode means and to control the current flow such that the ratio of current flows from the primary current source of these electrode means is constant while the measuring and intermediate electrode means are maintained at substantially the same potential. This constancy of ratio and equality of potential can be achieved in various manners depending upon the electrode arrangement, the current source and other factors.

The invention may be better understood from the following detailed description taken in conjunction with the accompanying drawings in which.

Like reference characters will be used for like parts throughout the several views.

Figure 1:
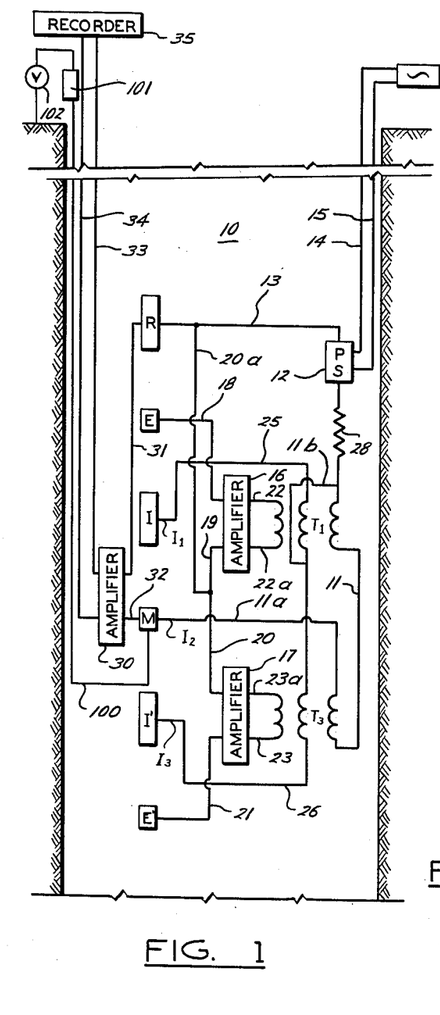
FIG. 1 is a schematic diagram of a preferred form of the electric logging system of this invention.

Referring now to FIG. 1 wherein a preferred form of the invention is shown, a measuring electrode M is disposed in borehole 10, the latter being filled with a liquid such as a drilling mud. The measuring electrode is connected by conductors 11 and 11a to a suitable current or power source 12 which in turn is connected by conductor 13 to a return electrode R to complete the circuit. The return electrode is preferably located so as to be electrically remote from the measuring electrode as well as from the other electrodes.

The power source can be of any type known to be suitable for electric logging. Preferably it provides an alternating current output to the measuring electrode and this can be derived from power supply cables 14 and 15 leading to the surface of the earth. Less preferably, the down-hole power supply can include batteries with suitable means, such as an alternator, for converting the direct current to an alternating current. If desired, the power supply 12 can be located at the surface of the earth. The power supply can take several forms and two of such will be discussed later.

Means are provided for establishing an electrical field vertically adjacent, preferably both above and below, the path of the measuring current flowing between electrodes M and R. In accordance with one aspect of this invention, the field is so distributed that the path of the measuring current is controlled in vertical depth for a desired distance in the formation laterally of the borehole.

The control of the measuring current pattern is effected by providing intermediate electrode means I and I' and end electrode means E and E' arranged respectively in pairs with the ones of each pair being on opposite sides of the measuring electrode. These electrodes means are connected in a circuit such that current flows from electrode means E and E' respectively to electrodes means I and I' and also to a point remote therefrom, such as return electrode R, the amount of current so flowing being such that the ratios of currents $I_1:I_2$ and $I_3:I_2$ (FIG. 1) are maintained at predetermined values. Means are provided, such as differential current transformers $T_1$ and $T_3$, for detecting departures of these ratios (error signals) from their desired values while maintaining the potential differences between electrode means M and I and I' substantially zero. Thus, the primary and secondary coils (which should be of low impedance) of the transformers are connected in the circuits of the measuring and intermediate electrodes as shown. Amplifiers 16 and 17 have their outputs connected, as by conductors 18, 19, 20a, and 20, 21, 20a, respectively, to electrode means E and E' and remote point R so that current flows from E and E' to I and I' respectively and also to electrode R. The input of the amplifiers is connected to the tertiary windings on differential current transformers $T_1$ and $T_3$, respectively by conductors 22, 22a and 23, 23a. In this manner, if the ratios of $I_1$ to $I_2$ or $I_3$ to $I_2$ differ from the predetermined values therefor, error signals are formed and fed to the amplifiers. In a preferred form, the amplifiers increase the current flow from electrode means E and E', respectively, upon the current ratios $I_1$ to $I_2$ and $I_3$ to $I_2$ increasing above the predetermined value therefor and decrease the current flow upon the current ratios falling below the predetermined values therefor.

In order to compensate for the effect of a formation or zone lying adjacent to that through which the measuring current is flowing and tending to distort the flow of the measuring current from its desired distribution, means are provided to in effect sense the resistivity of this adjacent formation. The resistivity of the adjacent formation is then compared with that through which the measuring current is flowing and suitable corrections made in the fields lying above or below the path of the measuring current to maintain the distribution of the latter in the desired configuration. Thus, in FIG. 1, the intermediate electrode means I and I' are connected to the power, as by conductors 11b, 25 and 26, as well as a coil in each of the transformers, so that current can flow between each of these electrode means and return electrode R via the formation around the borehole. The ratio of current $I_1$ to current $I_2$ and the ratio of current $I_3$ to current $I_2$ are maintained constant.

Any change in the ratio of the currents due to changes in the resistivities of the formations through which these currents flow will result in a change in potential difference across the tertiary coils of transformers $T_1$ and $T_3$ resulting in the amplifier 16 or 17 changing the potential of electrodes E or E' to cause a change in current flowing between electrode E and I or between E' and I' such as to bring the ratios of current $I_1$ to current $I_2$ and current $I_3$ to current $I_2$ substantially back to the desired predetermined values. Thus, the change in potential of E or E' will alter the field adjacent the path of the measuring current so that the desired distribution of the latter is maintained.

In a preferred form provision is made for maintaining $I_1+I_2+I_3$ constant as by connecting a high valued impedance 28 in conductor 11b. As the ratios $I_1$ to $I_2$ and $I_3$ to $I_2$ are also maintained constant, then each current is constant.

Means are also provided for measuring and recording changes in an electrical property existing in the flow path of the measuring current to obtain an indication of the resistivity of the formations transversed thereby. While a variety of such means can be provided, FIG. 1 shows an amplifier 30 deriving its input from the potential difference between the measuring electrode and a point (e.g. electrode R) remote therefrom as by being connected by conductor 31 to electrode R and by conductor 32, to the measuring electrode. The amplified signal is proportional to resistivity where $I_2$ is constant and is sent up the hole via conductors 33 and 34 to recorder 35.

While it is possible that many of the components indicated in FIG. 1 as being located downhole in the sonde could be located at the earth's surface, it is preferred they be downhole. It will be understood that the various conductors extending from the sonde to the earth's surface will usually be grouped with a supporting cable which in turn will be connected to suitable apparatus at the earth's surface for raising and lowering the sonde in the borehole. Also, there will be provided conventional means for correlating the record on recorder 35 with the depth of the sonde as it moves along the borehole. Further, many circuit refinements are not illustrated in the drawings but these can be supplied by the exercise of ordinary design skills. The above remarks also apply to the other embodiments illustrated herein.

Figure 2:
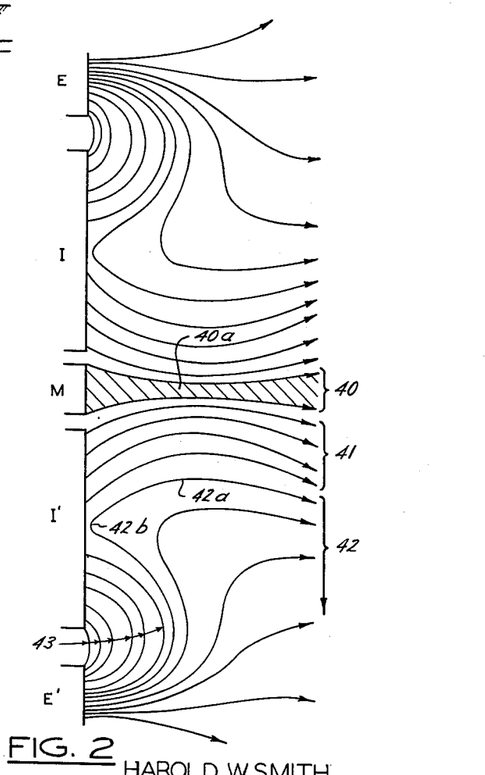
FIG. 2 is a half vertical section illustration of a current line distribution in a homogenous formation showing how a pinching effect on the measuring current can be accomplished.

Referring now to FIG. 2, there is shown an approximate flow pattern of current in a homogenous medium for the system of FIG. 1 wherein the current flows between electrodes E and I and between E' and I' have been increased sufficiently to demonstrate the pinch effect. It will be seen that the measuring current flows in a horizontal disc-like pattern as indicated by the current lines labelled 40. This pattern has a definite pinch as at region 40a and it will be seen the current density at region 40a is considerably higher than it is adjacent the electrode M. Therefore, the contribution of the formation at region 40a to the total resistivity measurement will be considerably greater than the contribution of the formation immediately adjacent the electrode M or of borehole fluid. It will also be seen that current flows from the ends of the intermediate electrode means I and I' adjacent the measuring electrode as indicated by the current lines labelled 41 for electrode I'. Further, a portion of the current flowing to the end electrode means flows to the intermediate electrode means, as indicated by the current lines 43, with the balance flowing to the return electrode as indicated by the current lines 42. There will be a current line, here labelled 42a which passes close to the intermediate electrode, and at some point along the latter's length is parallel to such electrode, as at 42b. This line then turns outwardly for flow toward the return electrode. The point 42b can be termed a null or zero point. Along that portion of the length of the intermediate electrode means between the null point and its end adjacent the measuring electrode, the net current flow will be outwardly from the intermediate electrode. Conversely, the net current flow will be into the intermediate electrode along its length between the null point and its end adjacent the end electrode means. Now, if it is assumed that a formation lying adjacent the path of the measuring current causes the pinch to decrease (e.g. as by the measuring electrode being disposed opposite a relatively thin resistive bed lying between upper and lower less resistive beds so that the measuring current lines tend to flare and the vertical depth of the measuring current flow path tends to increase at region 40a) there will result an increase in potential of the intermediate electrode with respect to the measuring electrode and an increase in the ratio of $I_1$ to $I_2$ and of $I_3$ to $I_2$. The resulting error signal (potential difference) is applied to the amplifier (16 or 17 as the case may be) which in turn causes an increase in current flowing from the end electrode and particularly to the intermediate electrode from such end electrode. This returns the potential difference between the intermediate electrode and the measuring electrode back to zero and in effect, causes null point 42b to shift toward the measuring electrode. The resulting change in the field lying to one side of the measuring current path is such as to tend to pinch the measuring current at region 40a back to its original configuration. On the other hand, should a formation be encountered by the measuring current which causes the pinch to increase (e.g. as by the measuring electrode being disposed opposite a relatively thin, conductive bed lying between upper and lower more resistive beds so that the vertical depth at 40a decreases), the resulting decrease in the ratio of $I_1$ to $I_2$ and $I_3$ to $I_2$ results in an error signal which causes the amplifiers to decrease the current flowing from the end electrodes to the intermediate electrodes. The resulting change in field permits the measuring current to spread at the pinch back to its original configuration.

Thus it can be seen that since the potentials of the measuring and intermediate electrodes are maintained essentially equal, changes in the ratio of the resistivities of formations through which currents from these electrodes flow will result in a change in the ratios of these currents and a change in the ratios of the currents will result in error voltage across the tertiary windings of one or both of the differential transformers $T_1$ and $T_3$. Since this error signal voltage produced by the current ratio change is employed to control the distribution of the field existing to either side of the measuring current flow path, it will be appreciated that a comparison is being made of the resistivities of the formations through which the measuring current and the current from the intermediate electrodes is flowing and that the intelligence derived from this comparison (the error signal) is used to control the configuration of the field.

In order to most forcefully demonstrate the concept of this invention, the apparatus has been described above to be operated so as to obtain the pinch effect of FIG. 2. However, it is to be emphasized that control of the measuring current density or flow path configuration achieved by the practice of this invention is not limited to obtaining a pinch effect in the sense shown in FIG. 2. On the contrary, the control concept is applicable to obtain any one of various maintainable measuring current flow patterns, e.g. diverging, parallel or converging and frequently a parallel current line pattern will be the most desirable.

Figure 2A:
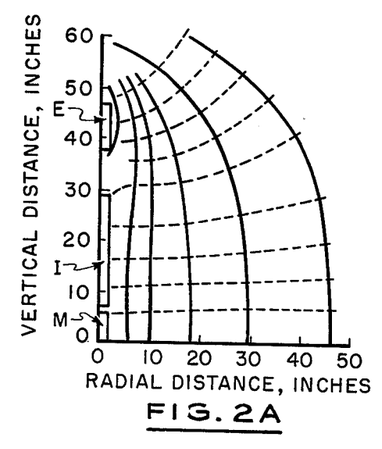
FIG. 2A is an upper quarter section illustration of the current and equipotential line configuration for the electrode array of FIG. 1 when used in a homogenous media formation, the current ratio of $I_1:I_2$ again being 4:1.
Figure 2B:
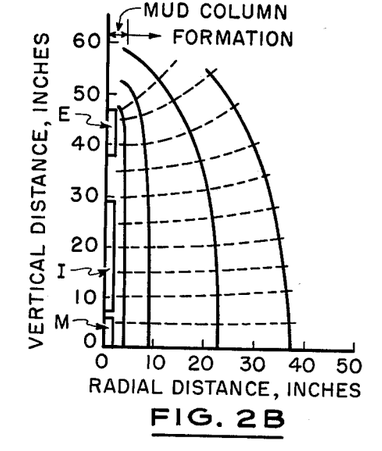
FIG. 2B is an illustration similar to FIG. 2A except current and equipotential line configuration is illustrated for the case where the electrode array of FIG. 1 is disposed in a four-inch radius borehole filled with mud having a resistivity of 0.02 of that of the surrounding formation, the current ratio of $I_1:I_2$ again being 4:1.
Figure 3A:
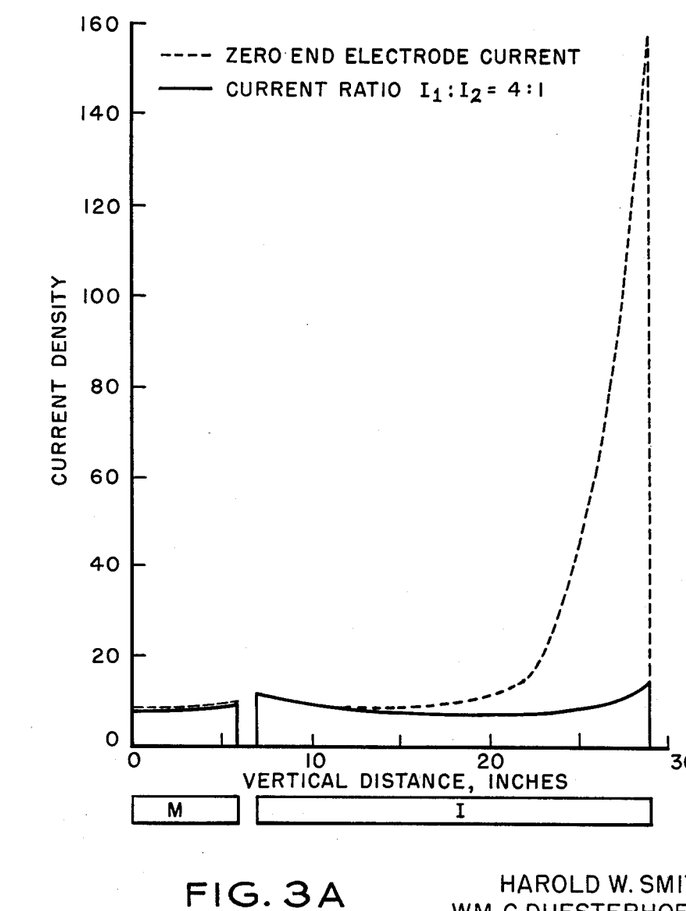
FIG. 3A illustrates the effect of the end electrodes and is a plot of current density radially of the measuring and intermediate electrodes with and without current flow from the end electrodes, the electrode array, circuit, $I_1:I_2$ current ratio and surrounding media being the same as described for FIG. 2B.

Thus, FIG. 2A indicates a substantially parallel measuring current line pattern which is obtained when the apparatus of FIG. 1 is placed in a homogenous media with a selected current ratio for $I_1$ to $I_2$ (and $I_3$ to $I_2$ for the lower section of the sonde, not shown) being 4:1. Now if the same apparatus and conditions are maintained except the apparatus is disposed in a borehole containing mud fifty times as conductive as the surrounding formation, substantially the same measuring current flow pattern is obtained as evidenced by FIG. 2B which shows the resulting current and equipotential line distribution for such a condition. It will be noted that by maintaining the ratio of $I_1$ to $I_2$ constant through the control of current flowing to or from the end electrodes the measuring current density pattern is maintained in its desired configuration. The effect of changing the current ratio is demonstrated in FIG. 3A which is a plot of the current density immediately radially adjacent the measuring and an intermediate electrode for the same system as FIG. 2B but with (solid line) and without (dashed line) end electrode current flow. With no end electrode current flow, the current density at the end of the intermediate electrode remote from the measuring electrode becomes very large indicating current is flowing up (or down) the mud column with a corresponding decrease in intermediate electrode potential. The resulting distortion of the field adjacent the intermediate electrode permits the measuring current ot tend to flare toward a diverging current line pattern. However, when end electrode current flow is established, so that the current ratio of $I_1$ to $I_2$ is caused to attain the desired value, the current density along the intermediate electrode becomes more uniform as shown by the solid line in FIG. 3A. The uniformity of this curve indicates the direct flow of current across the mud column into the formation so that the desired field is established and maintained in the formation to maintain the desired measuring current pattern, here a substantially parallel line pattern. This desired field is shown in FIG. 2B and its similarity to that of FIG. 2A is to be noted.

Figure 2C:
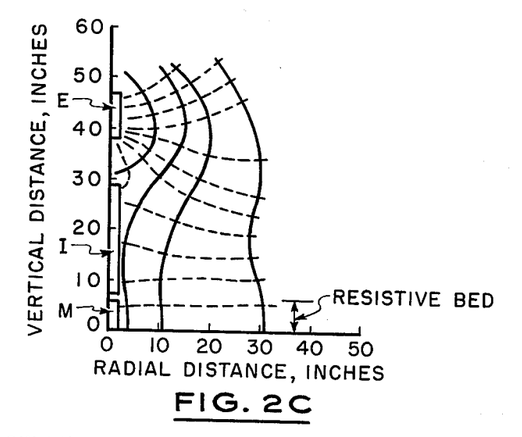
FIG. 2C is similar to FIGS. 2B and 2A except that the measuring electrode M is opposite a one foot thick formation bed having ten times the resistivity of the formations above and below the bed and also except that the mud in the borehole has a resistivity equal to that of the formations above and below the resistive bed.
Figure 3B:
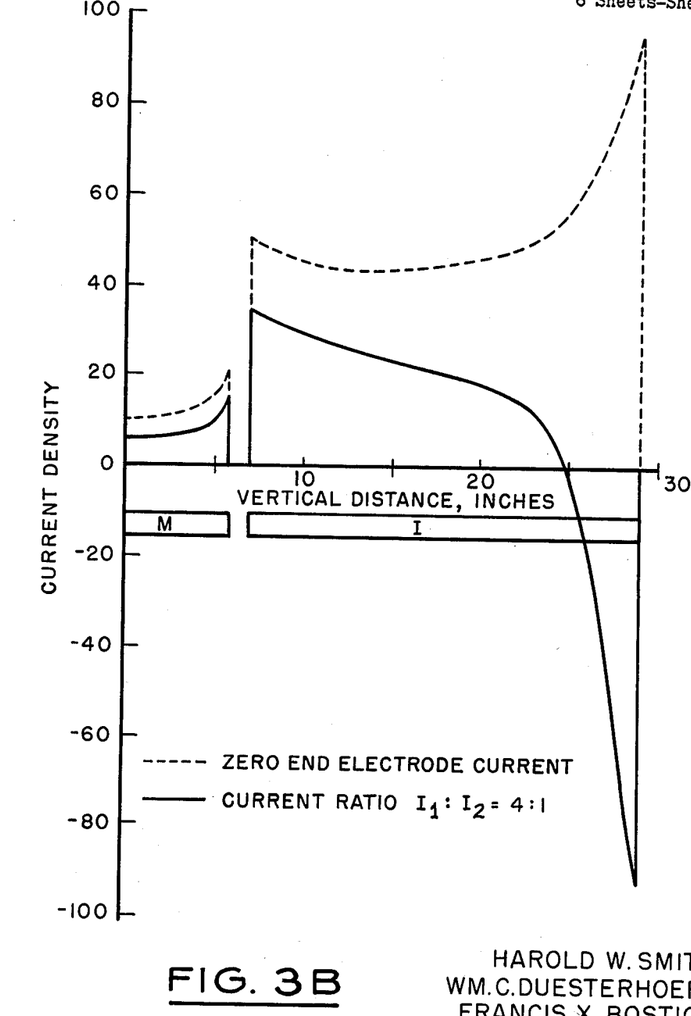
FIG. 3B is a plot similar to that of FIG. 3A except that the current density is plotted for the same conditions as described for FIG. 2C.

When the electrode array of FIG. 1 is disposed in a four inch radius borehole with the measuring electrode opposite a one foot thick bed having a resistivity ten times that of the formations above and below and with the borehole filled with mud having a resistivity equal to that of the upper and lower formations, the current and equipotential line distribution of FIG. 2C results with a $I_1$ to $I_2$ ratio of 4:1. The current density immediately adjacent the M and I electrodes is plotted in FIG. 3B. When no end electrode current is flowing (dashed line), it will be noted that the current density at the end of the intermediate electrode remote from the measuring electrode is again relatively large indicating the current lines are tending to flare out around the resistive bed. However, when the desired ratio of $I_1$ to $I_2$ is established and end electrode current is flowing, the current density at the remote end of the intermediate electrode becomes negative (i.e. current is flowing between this remote and the end electrode) and at some point along the intermediate electrode, the current density becomes zero (null point). The resulting concentration of current flowing between the intermediate electrode and a remote point, to only a portion of the length of the intermediate electrode next adjacent the measuring electrode causes the field shown in FIG. 2C to be established. It will be noted that the measuring current does not flare out around the highly resistive bed but instead its density remains very much like that of FIGS. 2A and 2B. Also, the radial flow of measuring current is maintained for a substantial distance into the formation even with the tendency of the current to flare around the highly resistive bed. This again demonstrates the "pinch effect" of this invention in that the measuring current is prevented from flaring and hence its pattern can be considered to be pinched as compared to the pattern it would assume if permitted to flare.

Reference has been made in the foregoing to the specific current ratio value of 4:1 for $I_1$ to $I_2$ or $I_3$ to $I_2$. It will be understood that this ratio value can vary over a considerable range, such as 0.1 to 10, and can even have values outside this range when desired. The most suitable ratio value will be dependent upon relative electrode lengths, relative electrode position and other factors and the optimum value can be determined for any given set of conditions by mere routine test.

Figure 4:
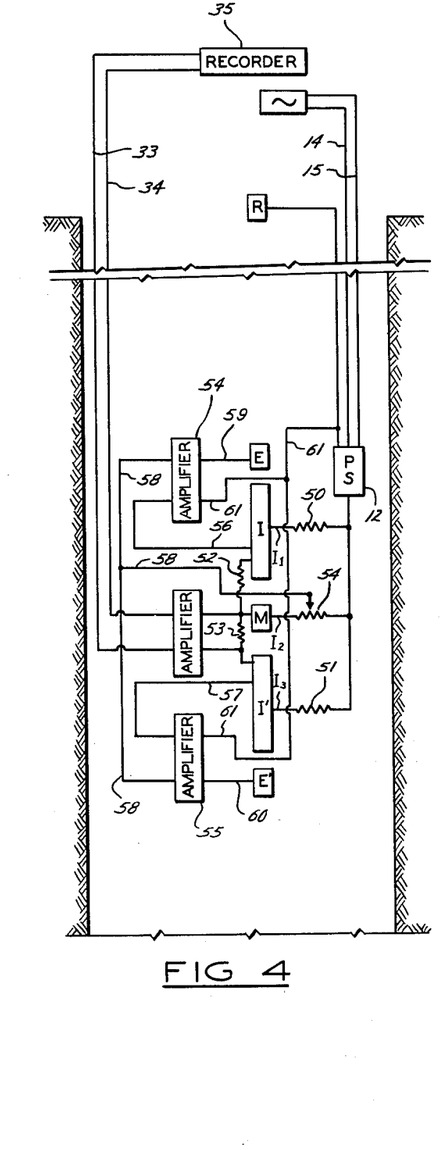
FIG. 4 is an alternative arrangement but which can accomplish the ultimate objectives of the arrangement of FIG. 1.

Referring now to FIG. 4, the electrode arrangement is similar to that of FIG. 1. However, a different circuit is provided to maintain the ratio of current $I_1$ to current $I_2$ and the ratio of current $I_3$ to current $I_2$ constant. Thus, power source 12 is provided as a constant voltage source and is connected to the intermediate electrodes I and I' through impedances 50 and 51, respectively. The intermediate electrodes are also each connected to the measuring electrode through impedances 52 and 53, respectively. By making impedances 52 and 53 very small, the intermediate electrodes and measuring electrode are all at virtually the same potential. By making impedances 50 and 51 very small, the intermediate electrodes as well as the measuring electrode, are all at substantially the same constant potential with respect to the return electrode R. The input to amplifiers 54 and 55 is taken from the respective intermediate electrodes (or equivalent) via wires 56 and 57 and, via wire 58, from summing potentiometer 54 which is of very high impedance relative to impedances 50, 51, 52 and 53. Therefore, the signal fed to the amplifiers 54 and 55 is the difference in the potential drops across impedances 50 and 52 and across impedances 51 and 53, respectively.

The output of the amplifiers is connected to the end electrodes by wires 59 and 60 and to the remote electrode R as by wire 61 so that current can flow between electrodes E and I, between E' and I' as well as between E, E' and remote electrode R.

The measured signal can be taken across one of impedances 53 or 52, amplified and sent up the hole via conductors 33 and 34 to recorder 35. This signal will be directly proportional to the conductivity of the formations traversed by the measuring current and its reciprocal can be taken as the resistivity.

Here again the ratio of current $I_1$ to current $I_2$ and the ratio of current $I_3$ to current $I_2$ are maintained constant. Thus, the voltage or potential difference applied to amplifiers 54 and 55 is proportional to the difference between currents $I_1$ and $KI_2$ and between current $I_3$ and $KI_2$, respectively, where K is the desired ratio of currents. Any change in the ratio of these currents gives an error signal to the input of the amplifiers which in turn raises or lowers the potential of the end electrodes relative to the intermediate electrodes. This change of potential results in a change in current flow between the respective end and intermediate electrodes and an alteration of the field so as to force the error signal back towards zero and maintain the fixed ratio of the currents $I_1$ to $I_2$ and $I_3$ to $I_2$.

If desired, the ratio of the potential difference between the measuring electrode M and an electrically remote reference point to the potential drop across one of impedances 40 can be measured and this can be amplified and sent to the surface of the earth as a resistivity reading.

Figure 5:
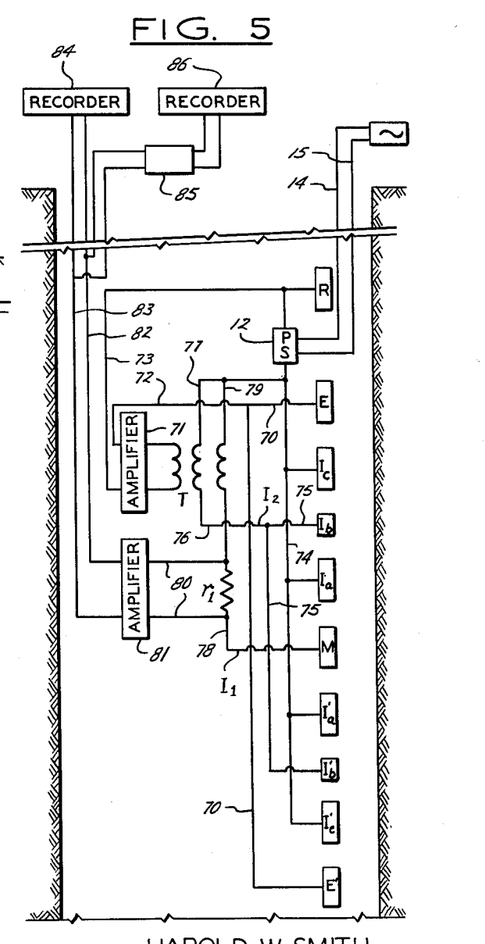
FIG. 5 illustrates a less preferred form of the invention.

Referring now to FIG. 5, end electrode E and E' are connected together by wire 70 which in turn is connected to the output of amplifier 71 by wire 72. The output of the amplifier is also connected by wire 73 to return electrode R. Intermediate electrodes $I_c$, $I_a$, $I_c'$ and $I_a'$ are also connected together by wire 74 which leads to power supply 12. Current sampling electrodes $I_b$ and $I_b'$ are connected together by wire 75 which in turn is connected by wire 76 to one of the coils of differential current transformer T. The other end of this coil is connected as by wire 77 to the power supply. The measuring electrode M is connected by wire 78 to another coil of the differential transformer which coil is also connected to the power supply by wire 79. The third coil of the differential transformer is connected with the amplifier 71 to supply an input signal thereto. A low impedance resistor $r_1$ is connected in the measuring electrode circuit as shown to provide a small voltage drop which is applied by wires 80 to the input of amplifier 81. The output of this amplifier can be taken to the surface via wires 82 and 83 for recording on recorder 84.

In this particular instance, power supply 12 can be a constant potential source and with the circuit as shown and with $r_1$ being of sufficiently small value, substantially the same potential is applied to all the electrodes between the end electrodes. Current will flow between all of these electrodes and the return electrode R. The distribution of current density along the sonde is controlled by fixing the ratio of $I_1$ to $I_2$. Any variation in this ratio will cause the differential transformer T to send an error signal to amplifier 71 and depending upon the amplitude and polarity of the error signal, the amplifier will change the potential of end electrodes E and E' to bring the error signal back to zero. In so doing, the current ratio is brought back to its desired value and the current density pattern of the measuring current flowing from measuring electrode M is returned to its desired configuration. It will thus be seen that the general operation of the system is somewhat similar to that of FIG. 1 and the fundamental difference between the two systems is in the manner in which the current distribution curve is sampled. Also, in FIG. 5, the potential of all the electrodes between the two end electrodes is maintained constant and equal to each other so that the current of $I_1$ is a function of the true conductivity of the formation. Therefore, recorder 84 will record conductivity rather than resistivity. Where a resistivity record is desired, the output of amplifier 81 can be passed through a reciprocating circuit 85 whose function is to supply an output signal that is the reciprocal of its input signal. This output can then be recorded by resistivity recorder 86.

Figures 6, 7:
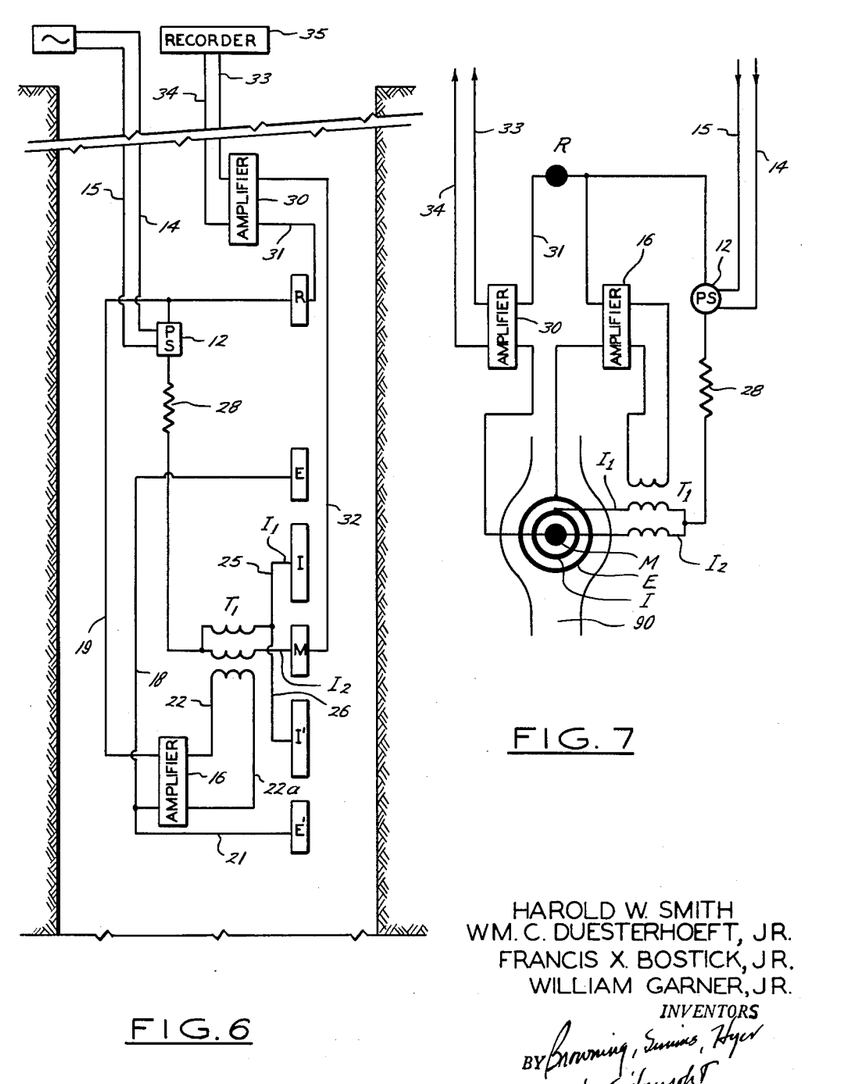
FIG. 6 illustrates a simplified version of FIG. 1 but is less preferred than the arrangement of FIG. 1.
FIG. 7 illustrates a wall contact electrode arrangement in accordance with this invention.

Turning now to FIG. 6, the circuit and electrode array is basically similar to that of FIG. 1 except that a single differential transformer feeds a single amplifier 16 which in turn has its output connected not only to the return electrode as in FIG. 1 but also to both of the end electrodes. Also, both intermediate electrodes are connected to a single coil of the differential transformer. In effect, then, the system of FIG. 6 can be classified as a symmetrical system and that of FIG. 1 as an asymmetrical system in that both the upper half and the lower half of the sonde in FIG. 6 are operated in unison with one another, whereas the upper half of the sonde in FIG. 1 is capable of operating independently of the lower half.

The system of FIG. 6, while having less components than that of FIG. 1, is not as desirable because of its symmetrical operation. Thus, if the formation dictates a larger flow of current from electrode E and no change in flow of current from electrode E', both electrodes will increase in current flow.

The electrode arrangements of this invention can also be disposed for wall contact logging as indicated in FIG. 7. In this figure, a conventional pad 90 is arranged on a body (not shown) so that the face of the pad is resiliently urged into contact with the wall of the borehole. The various electrodes are then preferably arranged as concentric annular rings as shown with the end electrode E being on the outside, measuring electrode M at the center and intermediate electrode I therebetween. The balance of the circuitry can be as in the other figures, especially as in FIG. 6.

It is also possible to measure the spontaneous potential. To do this, a conductor 100 is connected to the measuring electrode as indicated in FIG. 1. The conductor is connected to a remote reference ground via a filter 101 and a recording volt-meter 102. Conductor 100 alternatively could be connected to electrodes I or E but this is not desirable as it would require a depth correction in the conventional recording system now in use.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without references to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. In a method for investigating the electrical resistivities of earth formations traversed by a borehole, the steps comprising passing current between a first location in the borehole and a point remote from said first location so as to establish an electrical field in the earth formation laterally of the first location, passing current between a second location in the borehole and a third location also in the borehole but intermediate said first and second locations and also simultaneously passing current between said second location and a point remote therefrom, controlling the amount of current flowing between said second and third locations so as to maintain said first and third locations at substantially equal potential as said locations are moved as a group past non-homogenous earthen formations, and obtaining an indication of variations in an electrical property existing between said first location and a point remote therefrom.

2. In a method for maintaining a desired electrical field distribution in a variety of earthen formations as apparatus for creating such field is moved through a borehole comprising establishing a first field in one formation, establishing a second field vertically adjacent the first field and of an intensity and polarity to cause the first field to have the desired distribution in said formation, sensing changes in the distribution of both fields laterally of the borehole as the fields are moved therealong, and comparing the change in each of said fields and, based upon said comparison adjusting the distribution of at least one of said fields as required to maintain the first field in its desired configuration.

3. In a method for establishing a vertically confined electric field extending laterally of a borehole into an earthen formation with the field having a lesser vertical depth at a point in the formation than it does in the borehole which comprises establishing a first field extending laterally of the borehole into an earthen formation, flowing current between a first location longitudinally spaced in the borehole from said field and a second location in the borehole intermediate the first location and said field and also a point remote from said first location so that a second field is established in the formation causing the vertical depth of the first field at a point spaced laterally of the borehole in the formation to be less than its depth in the borehole and moving the fields together along the borehole so that they encounter a non-homogenous earthen formation while at the same time regulating the amount of current flowing between said first and second locations so as to maintain the first field in a desired configuration despite distortive influence of the non-homogenous formation encountered by the first field as the borehole is traversed.

4. A method for measuring the resistivity of earthen formations traversed by borehole comprising flowing current between first, second and third locations in the borehole and a point remote therefrom, the first and second locations being adjacent each other and also flowing current between a fourth location and a fifth location situated in the borehole, the fourth and fifth locations being intermediate the third and second locations with fifth location adjacent the second location, adjusting the current flowing between the fourth and the fifth location to be such that the first and second locations are at substantially the same potential and also such that the currents flowing to or from the first and second locations are held in a fixed ratio, and measuring the potential difference between one of the first and second locations and a reference point remote therefrom.

5. A method for measuring the resistivity of earthen formations traversed by a borehole comprising passing current between a first location in the borehole and a point remote therefrom, passing current between a pair of locations respectively located on opposite sides of first location and longitudinally spaced therefrom and a point remote therefrom, maintaining the potential difference between said first location and said pair of locations at substantially zero, detecting the ratio of current passing to a second location to that passing to the first location, maintaining said ratio at a desired value by passing current between two adjacent but spaced apart pairs of points in the borehole, said pairs of points being located respectively on opposite sides of said one location but spaced therefrom a greater distance than said pair of locations and also passing current between one point of each of said pairs of points and a point remote therefrom, and detecting the potential difference between said one location and a reference point as an indication of the resistivity of the formation.

6. A method for measuring the resistivity of earthen formations traversed by borehole comprising establishing first, second, third, fourth and fifth spaced apart locations in a borehole, passing currents respectively between said first, second, and fifth locations and a point remote therefrom, maintaining the potential difference between said first and the second locations substantially constant, passing a third current between the third and fourth locations, varying the third current to maintain the ratio of the first and second currents at a desired value, and detecting a potential difference between one of said first and second locations and a reference point remote therefrom as an indication of a property of a formation spaced laterally of the borehole.

7. A method for measuring the resistivity of earthen formations traversed by a borehole comprising flowing a first current between a first location in the borehole and a point remote therefrom, establishing electrical fields above and below the path of flow of said first current so as to constrain the path to a horizontal disc-like shape for a substantial distance into the formations, sensing changes in the resistivity of formations lying adjacently above and below the flow path of the first current as the first location is moved along the borehole, altering said fields in accordance with said changes so as to substantially compensate for the effect of said adjacent formations on said flow path whereby the distribution of said first current can be maintained substantially constant, and measuring variations in an electrical property existing between said first location and a reference point to obtain indications of the resistivity of the earthen formations.

8. A method for measuring the resistivities of earthen formations traversed by a borehole comprising flowing first and second currents respectively between spaced apart locations in the borehole and a point remote therefrom, establishing an electrical field vertically adjacent to the flow path of the first current so that said flow path has a desired configuration laterally of the borehole, sensing changes in the resistivity of formations traversed by the second current as said locations are moved along the borehole, altering said field in accordance with said changes so as to maintain said desired configuration of the first current's flow path, and measuring changes in an electrical property existing in said flow path to obtain an indication of the resistivity of formations traversed thereby.

9. The method of claim 8 wherein said field is altered so as to maintain constant the ratio of said first current and second current to the remote point.

10. In a well logging apparatus, the combination of at least first, second and third longitudinally spaced apart electrode means arranged to be lowered into a borehole, means connected between the first electrode means and a point remote therefrom for causing current flow through earth formations between said first electrode means and said point, means connected between the second electrode means and a point remote therefrom for causing current flow through earth formations between said second electrode means and said point, means responsive to a ratio of currents flowing to the first and second electrode means and maintaining said ratio at a desired value by flowing current between the third and second electrode means and also between the third electrode means and a point remote therefrom, the last mentioned means also maintaining the first and second electrode means at the same potential, and means for sensing changes in an electrical property existing between said first electrode means and a remote point.

11. In a well logging apparatus, the combination of at least first, second and third longitudinally spaced apart electrode means arranged to be lowered into a borehole, means connected between the first electrode means and a point remote therefrom for causing current flow through earth formations between said first electrode means and said point, means connected between the second electrode means and a point remote therefrom for causing current flow through earth formations between said second electrode means and said point, means responsive to a potential difference between the first and second electrode means so as to reduce said potential difference to a desired value by flowing current between the third and second electrode means and also between the third electrode means and a point remote therefrom, and means for sensing changes in an electrical property existing between the first electrode means and said remote point.

12. In a well logging apparatus, the combination of first, second and third longitudinally spaced apart electrode means arranged to be lowered into a borehole, circuit means connected between the first, second and third electrode means and a point remote therefrom and including an electrical source for causing current to flow through said circuit means and between said first, second and third electrode means and said remote point, means for maintaining substantially constant the potential difference between the first and second electrode means, means for maintaining substantially constant the ratio of currents flowing to said first and second electrode means from said source and including means for flowing current from the third electrode means to the second electrode means and to the remote point responsive to changes in said ratio to maintain said ratio constant, and means for sensing changes in an electrical property existing between the first electrode means and said remote point.

13. In a well logging apparatus, the combination of at least first, second and third electrode means spaced apart from each other and arranged to be lowered in a borehole, means connected with said first and second electrodes means for supplying first and second currents respectively thereto for flow into surrounding earthen formations to a point remote from the electrode means, and means connected to the third electrode means for flowing current therefrom to a point remote therefrom and also to said second electrode means responsive to changes in the ratio of resistances of earthen formations to which the first and second currents flow, and means for sensing changes in an electrical property existing between one of the first and second electrode means and a reference point.

14. In an electrical well logging apparatus, the combination of at least five longitudinally spaced apart electrode means arranged to be lowered through the borehole, means connected between the center electrode means and a point remote therefrom for passing current through earthen formations surrounding the borehole between said center electrode means and a remote point, means connected between each of intermediate electrode means which are located on opposite sides of the center electrode means and a point remote therefrom for passing current through earthen formations surrounding the borehole between said electrode means and a remote point, means for maintaining the potential difference between said center and intermediate electrode means at substantially zero, means responsive to the ratio of currents flowing to the center electrode means and intermediate electrode means which are located on opposite sides of the center electrode means, respectively, for passing current between the end electrode means and the intermediate electrode means to maintain said ratio at a desired value and also for passing current to a point remote from said end electrode means, and means for sensing a change in an electrical property existing between said first electrode means and said remote point.

15. An electrical well apparatus comprising at least five longitudinally spaced apart electrodes arranged to be lowered into a borehole, constant current source means connected to the center and to the intermediate electrodes which lie on opposite sides of the center electrode and to a point remote from the center and intermediate electrodes for passing current from each of the center and intermediate electrodes through the formations surrounding the borehole, an impedance in each of the connections between the source and the center and intermediate electrodes fixing the ratio of currents flowing to the intermediate electrodes and to the center electrode, means connected between the end electrodes and the remote point for supplying current to the end electrodes for flow to the intermediate electrodes and to the point remote, the last named means being responsive to the potential difference between the center and intermediate electrodes and regulating the flow of current from the end electrodes to the intermediate electrodes to maintain said potential difference substantially zero, and means sensing changes in an electrical property existing between the center electrode and said remote point.

16. The apparatus of claim 15 wherein the last named means includes an amplifier means having its output connected to an end electrode and the remote point and its input connected to the center and intermediate electrodes.

17. An electrical well logging apparatus comprising at least five electrodes longitudinally spaced apart and arranged to be lowered into a borehole, a constant current source connected between a point remote from said electrodes and the center and intermediate electrodes for flow of current from each of said center and intermediate electrodes through the formation surrounding the borehole, said connection to the center and intermediate electrodes including low impedance primary and secondary coils, respectively, of a current differential transformer such that the potential difference between the center and intermediate electrodes remains at substantially zero, means for maintaining the ratio of the first and second electrode currents constant and for controlling the current density of current flowing from the center electrode at a substantial distance laterally thereof, including means for flowing current from the end electrodes to the respective intermediate electrodes and also to a point remote from the end electrodes, the last mentioned means being responsive to the potential difference across a tertiary winding of said transformer and being of a polarity to reduce the tertiary winding voltage to zero so as to maintain said ratio substantially constant, and means for sensing an electrical property existing between the center electrode and a remote reference point.

18. A method for measuring the resistivity of earthen formations traversed by borehole comprising flowing current between first and second adjacent locations in the borehole to a point remote therefrom, and also flowing current from a third location to a fourth location situated in the borehole, the fourth location being intermediate the third and second locations, adjusting the current flowing to the third and the fourth locations to be such that the first and second locations are at substantially the same potential, and measuring the potential difference between one of the first and second locations and a reference point remote therefrom.

19. A method for measuring the resistivity of earthen formations traversed by a borehole comprising passing current between one location in the borehole and a point remote therefrom, detecting a potential difference which is a function of the potential difference between said first location and a pair of locations respectively located on opposite sides of first location and longitudinally spaced therefrom, reducing the potential difference between said first location and said pair of locations to substantially zero by passing current between two adjacent but spaced apart pairs of points in the borehole, said pairs of points being located respectively on opposite sides of said one location but spaced therefrom a greater distance than said pair of locations and also passing current between one point of each of said pairs of points and a point remote therefrom, and detecting the potential difference between said one location and a reference point as an indication of the resistivity of the formation.

20. In a well logging apparatus, the combination of at least first, second and third longitudinally spaced apart electrode means arranged to be lowered into a borehole, means connected between the first electrode means and a point remote therefrom for causing current flow through earth formations between said first electrode means and said point, means responsive to a potential difference between the first and second electrode means so as to reduce said potential difference to a desired value by flowing current between the third and second electrode means and also between the third electrode means and a point remote therefrom, and means for sensing changes in an electrical property existing between the first electrode means and said remote point.

References Cited in the file of this patent

UNITED STATES PATENTS

| | | |
|---|---|---|
| 2,712,627 | Doll | July 5, 1955 |
| 2,712,628 | Doll | July 5, 1955 |
| 2,712,631 | Ferre | July 5, 1955 |
| 2,752,561 | Gillies | June 26, 1956 |
| 2,770,771 | Schuster | Nov. 13, 1956 |
| 2,803,796 | Schuster | Aug. 20, 1957 |
| 2,806,201 | Schuster | Sept. 10, 1957 |
| 2,824,279 | Ferre et al. | Feb. 18, 1958 |
| 2,872,638 | Jones | Feb. 3, 1959 |
| 2,884,590 | Welz | Apr. 28, 1959 |
| 2,891,215 | Fearon | June 16, 1959 |